United States Patent [19]

Bolante

[11] Patent Number: 4,842,548
[45] Date of Patent: Jun. 27, 1989

[54] PLASTIC CONDUIT CONNECTOR FOR FLEXIBLE CONDUIT

[75] Inventor: Jay J. Bolante, Chicago, Ill.

[73] Assignee: Appleton Electric Co., Chicago, Ill.

[21] Appl. No.: 211,089

[22] Filed: Jun. 24, 1988

Related U.S. Application Data

[63] Continuation-in-part of Ser. No. 037,632, Apr. 13, 1987, abandoned.

[51] Int. Cl.$^4$ ............................................. F16L 19/00
[52] U.S. Cl. ................................... 439/461; 174/65.55; 174/78; 285/342; 285/382.2
[58] Field of Search ............... 439/461, 462; 285/331, 285/342, 343, 382.7, 382.2; 174/78, 89, 65 R, 65 G, 65 SS

[56] References Cited

U.S. PATENT DOCUMENTS

| | | | |
|---|---|---|---|
| 2,439,351 | 4/1948 | Thayer et al. | 285/247 |
| 3,195,933 | 7/1965 | Jacobs | 285/342 |
| 3,240,868 | 3/1966 | Ets-Hokin et al. | 174/93 |
| 3,260,790 | 7/1966 | Alsup | 174/51 |
| 3,365,216 | 1/1968 | Babylon | 285/158 |
| 3,476,412 | 11/1969 | Demler, Sr. | 285/322 |
| 3,603,912 | 9/1971 | Kelly | 174/65 SS |
| 3,647,934 | 3/1972 | Hartt | 174/65 R |
| 3,659,880 | 5/1972 | Goldsobel | 285/161 |
| 3,744,008 | 7/1973 | Castellani | 339/103 |
| 4,058,330 | 11/1977 | Wolf | 285/174 |
| 4,116,472 | 9/1978 | Schmitt | 285/4 |
| 4,136,897 | 1/1979 | Haluch | 285/342 |
| 4,145,075 | 3/1979 | Holzmann | 285/81 |
| 4,150,250 | 4/1979 | Lundberg | 439/462 |
| 4,234,218 | 11/1980 | Rogers | 285/162 |
| 4,253,686 | 3/1981 | Aitken et al. | 285/382.7 |
| 4,293,178 | 10/1981 | Lee | 339/103 R |
| 4,350,840 | 9/1982 | Michaels | 174/65 SS |
| 4,358,079 | 11/1982 | Navarro | 248/56 |
| 4,386,817 | 6/1983 | Benker et al. | 339/103 B |
| 4,481,697 | 11/1984 | Bachle | 24/135 R |
| 4,494,779 | 1/1985 | Neff et al. | 285/159 |

FOREIGN PATENT DOCUMENTS

| | | | |
|---|---|---|---|
| 312365 | 7/1968 | Sweden | 174/89 |
| 832642 | 7/1979 | U.S.S.R. | 174/65 SS |
| 2045883 | 11/1980 | United Kingdom | |

OTHER PUBLICATIONS

Hubbell, Kellems, sales brochures.
T & B, sales catalog & brochures.
Carlon, sales brochure, 2/1/85.
Woodhead, "MAX LOC", sales brochures.
Olflex, "Skin Top", sales brochure.
0-2/Cedney, sales catalog.
Raco, catalog, Fluid-Tight Flexible Nonmetallic Conduit Connectors, p. 29.

Primary Examiner—Neil Abrams
Attorney, Agent, or Firm—Jones, Day, Reavis & Pogue

[57] ABSTRACT

A two-piece, all plastic connector for connecting a flexible conduit to an electrical fixture comprising a threaded connector cap having an extending wedging ring and a mating threaded connector body having a deflection ramp. The connector body is secured to an electrical fixture and the connector cap is loosely threadably engaged with the connector body. The conduit is inserted through an opening in the connector cap until it abuts the bottom of an annular cavity in the connector body. The cap is then tightly screwed onto the body such that the wedging ring is cammed, by the deflection ramp, into engagement with the conduit to securely grip the conduit. This arrangement provides a liquid-tight seal.

11 Claims, 5 Drawing Sheets

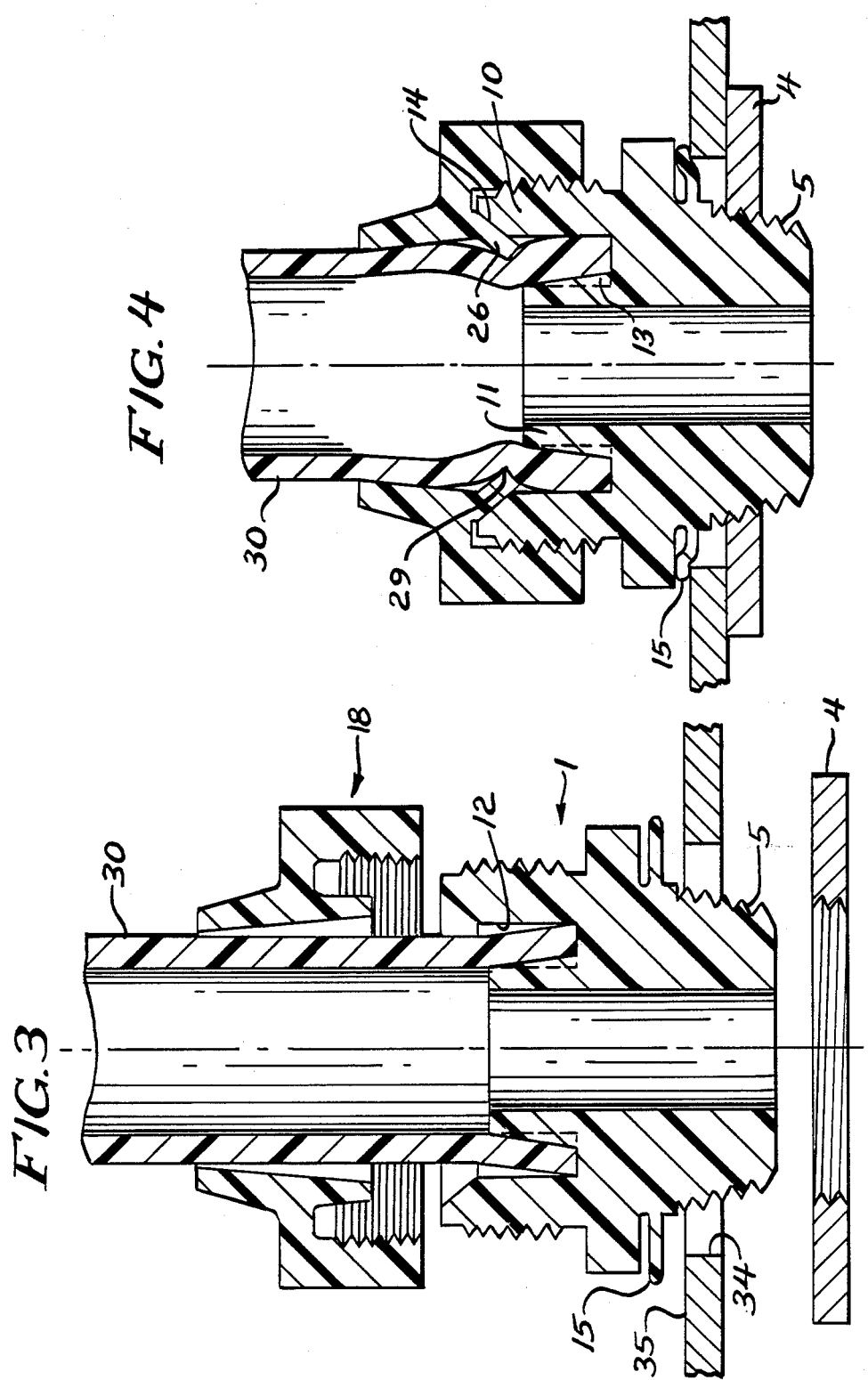

PLASTIC CONDUIT CONNECTOR FOR FLEXIBLE CONDUIT

This application is a continuation-in-part of application Ser. No. 037,632, filed 4/13/87 and now abandoned.

BACKGROUND OF THE INVENTION

The present invention relates, generally, to electrical connectors and, more particularly, to liquid-tight conduit connectors which connect electrical fixtures, such as junction or outlet boxes, with liquidtight flexible conduits.

Liquidtight flexible conduits are used to protect electric current-carrying wires. The wires are covered by one or more layers of insulation, such as rubber or plastic resin. The covered wires are then pulled through the elongated axial bore of the flexible conduit and are thereby protected.

Liquid-tight flexible conduit is used in environments in which the conduit is subject to multi-bends and heavy use and is exposed to chemical or liquid spray. Traditionally, the liquid-tight flexible conduit has been metallic. Moreover, a less expensive flexible plastic conduit has been developed and is also known to those skilled in the art. However, adequate connectors have not been developed which can simply but effectively form a liquid-tight coupling between the flexible plastic or metallic conduit and the electrical fixture. These known connectors employ a relatively high number of parts which are cumbersome to assemble and which do not effectively clamp and seal the conduit. Moreover, the metal parts used in many of the known connectors require machining, thus substantially increasing the cost of manufacture.

SUMMARY OF THE INVENTION

The present invention overcomes the above noted difficulties by providing a simple, inexpensive and effective connector. The connector is of a two-piece, all plastic construction which requires no machining.

The connector assembly consists of a connector body and connector cap. Tapered pipe threads on the body secure the connector assembly to an electrical fixture. Another set of threads on the connector body engage a corresponding set of mating threads on the connector cap. A flexible plastic conduit is inserted through bore in the cap and into the connector body. When the cap is tightly screwed onto the body, the tubular plastic conduit is locked into the connector assembly to form a liquid-tight seal.

To make this connection, the internally threaded cap is loosely screwed onto the connector body and the conduit is inserted through the bore in the connector cap and is pushed into engagement with the bottom of an annular cavity formed in the connector body. The threaded cap is then tightly screwed into engagement with the connector body. As the cap approaches the fully tightened position, a wedging ring on the cap is deformed by a deflection surface on the body into engagement with the outer periphery of the flexible conduit. The wedging ring of the cap and an internal support of the body grip and conduit to prevent rotation and pull-out of the conduit.

OBJECTS OF THE INVENTION

It is a general object of this invention to provide an improved connector for use with a flexible plastic and metallic conduit which provides a liquid-tight seal.

It is a further object to provide a connector of a two-piece construction which is easier to assemble and operate than the known prior art devices.

It is another object to provide a connector which is made entirely of plastic, thereby reducing the cost of manufacture by eliminating all machining processes.

It is to be understood that other objects of the invention, in addition to those set forth above, will become apparent to those skilled in the art from the following detailed description and drawings.

BRIEF DESCRIPTION OF THE DRAWINGS

FIG. 3 is a section view of the connector assembly in its disconnected condition;

FIG. 4 is a section view of the connector assembly in its connected condition;

DETAILED DESCRIPTION OF THE PREFERRED EMBODIMENT

Figure 1:
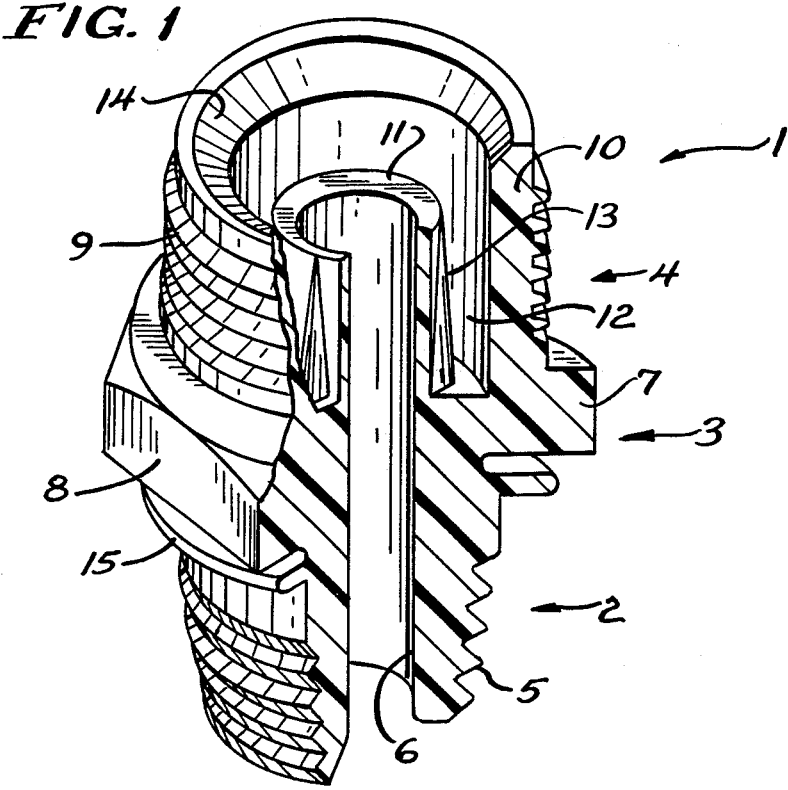
FIG. 1 is a partially cutaway isometric view of the connector body.

Referring more particularly to the drawings, FIG. 1 shows the connector body, generally designated 1. The connector body 1 consists of an unitary piece of molded plastic and provides a smooth insulated bore for the wires of the conduit.

The connector body 1 consists of a first portion 2, central portion 3 and second portion 4. The first portion 2 is provided with external tapered pipe threads 5 which engage either a set of mating threads on the electrical fixture or a locknut 4 to create a sealed coupling between the fixture and the connector.

The connector body central portion 3 is provided with a wrenching shoulder 7. The wrenching shoulder 7 consists of a series of flat faces 8 arranged around the periphery of the connector body 1 for engagement with a wrenching tool. In the preferred embodiment, eight flat faces are provided; however, this number may vary depending on the specific design employed. The connector body lower portion 2 and central portion 3 are provided with a centrally located axially disposed bore 6.

The connector body second portion 4 is provided with external unified threads 9. These threads are engageable with a set of mating threads 23 formed on the connector cap 18, to be hereinafter described.

As shown in FIG. 1, the unified threads 9 are formed on the outer surface of a ring member 10. Located internally of the ring member 10 is an internal conduit support 11 defined by an annular cavity 12. The internal conduit support 11 forms part of the bore 6.

Located on the outer periphery of the internal conduit support 11 are a plurality of anti-rotation ribs 13. In the preferred form, shown in FIGS. 1, 3 and 4, the ribs 13 are tapered with respect to the internal conduit support 11, such that they circumscribe a larger diameter at the base of the cavity 12 than at the mouth of the conduit support 11. Other designs for the antirotation ribs are also possible, for example, a plurality of teeth extending outwardly from the arranged at regular intervals around the mouth of the conduit support could also be used. The preferred ribs have, basically, a triangular profile. However, other profiles, such as square or rectangular, are also contemplated.

The ring member 10 is provided with a deflection ramp 14. The deflection ramp 14 functions to radially cam a wedging ring, located on the connector cap 18, into engagement with the flexible conduit, as will hereinafter be described.

Disposed in the central portion 3 of the connector body 1, between the tapered pipe threads 5 and the wrenching shoulder 7, is an integrally formed sealing ring 15. The sealing ring 15 is of such a thickness as to be able to flex. When the connector body 1 is threadably engaged with an electrical fixture, the sealing ring 15 will contact the fixture and will flex, as shown in FIG. 4. The recovery force, provided by the resiliency of the sealing ring 15, will insure that the sealing ring 15 remains in tight contact with the fixture. While the illustrated embodiment shows the sealing ring integrally formed with the connector body 1, it is contemplated that a separate sealing means could also be used.

Figure 2:
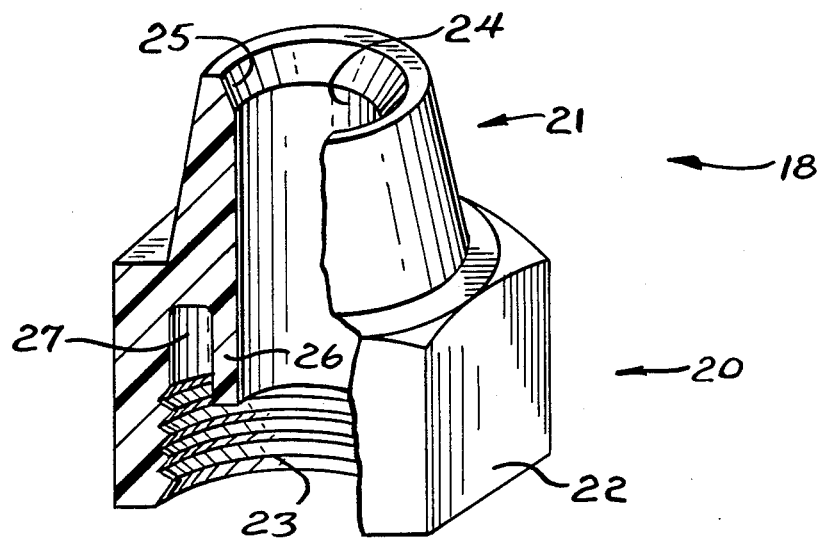
FIG. 2 is a partially cutaway isometric view of the connector cap.

FIG. 2 shows the connector cap, generally, at 18. The connector cap 18 consists of a first portion 20 and second portion 21. The first portion 20 is provided with a series of flat surfaces 22 arranged about the outer periphery of the connector cap 20, engageable with a wrenching tool. The first portion 20 is also provided with internal unified threads 23 which mate with the unified threads 9 of the connector body.

The connector cap second portion 21 is provided with an internal bore 24 which receives a flexible conduit 30. The bore 24 insulates the liquidtight seal from the strain caused by radial bending of the conduit, near the juncture with the connector, by dissipating the bending force along the entire length of the bore. The mouth of the bore 24 is beveled at 25 to facilitate the insertion of the conduit into the connector cap 18.

Located within the threaded area of the first portion 21 is a wedging ring 26 formed by an annular cavity 27. The wedging ring 26 is coextensive with the bore 24, such that the wedging ring 26 forms an extension of the internal bore 24.

FIG. 3 shows the connector body 1, connector cap 18, locknut 4, flexible conduit 30 and electrical fixture 35 in their disassembled state. To assemble the connector, the connector body 1 is first attached to a wall of the electrical fixture 35. This can be accomplished either by screwing the tapered threads 5 directly into the aperture 34 of by inserting the threads through the aperture 34 and securing the device with the locknut 4, as shown in FIGS. 3 and 4. The conduit 30 is then inserted through the connector cap 18 until the bottom edge of the conduit 30 abuts the base of the annular cavity 12. It should be noted that the cap 18 need not be completely disconnected from the connector body 1 to perform the assembly operation. This is shown for illustrative purposes only. During actual assembly, the cap need only be loosened such that the wedging ring 26 is not cammed into the path of the conduit 30 by the deflection ramp 14.

The connector cap 18 is then screwed tightly down onto the connector body until the device assumes the position of Figure 4. As the cap 18 is screwed down, the ring member 10 moves into the annular cavity 27 of the cap and the wedging ring 26 contacts and slides along the deflection ramp 14. Because the deflection ramp 14 is angled downwardly and inwardly, relative to the connector body 1, the wedging ring 26 is cammed towards the conduit such that the edge of the edging ring 26 engages the plastic conduit as shown at 29 in FIG. 4. Continued tightening of the connector cap 18 causes the wedging ring 26 to drive the conduit toward the connector body 1 to create a seal with the base of the cavity 12. When this occurs the conduit inside diameter is forced onto the larger diameter circumscribed by the antirotation ribs 13 at the base of the cavity 12 to further eliminate any twisting as the cap is tightly screwed down. As the wedging ring 26 compresses inwardly it causes the portion of the conduit below the wedging ring to bell or flare outwardly so that the outer periphery of the conduit presses against the wall of the ring member 10 to provide an additional seal, shown in FIG. 4. The force of the wedging ring 26 on the conduit also causes the material of a plastic conduit to spread which expands the thickness of the conduit in the cavity thereby insuring a complete seal between the conduit and the connector body 1. In this manner, the conduit 30 is locked into the connector between the wedging ring 26 and the internal conduit support 11 to form a liquidtight seal.

Figure 5:
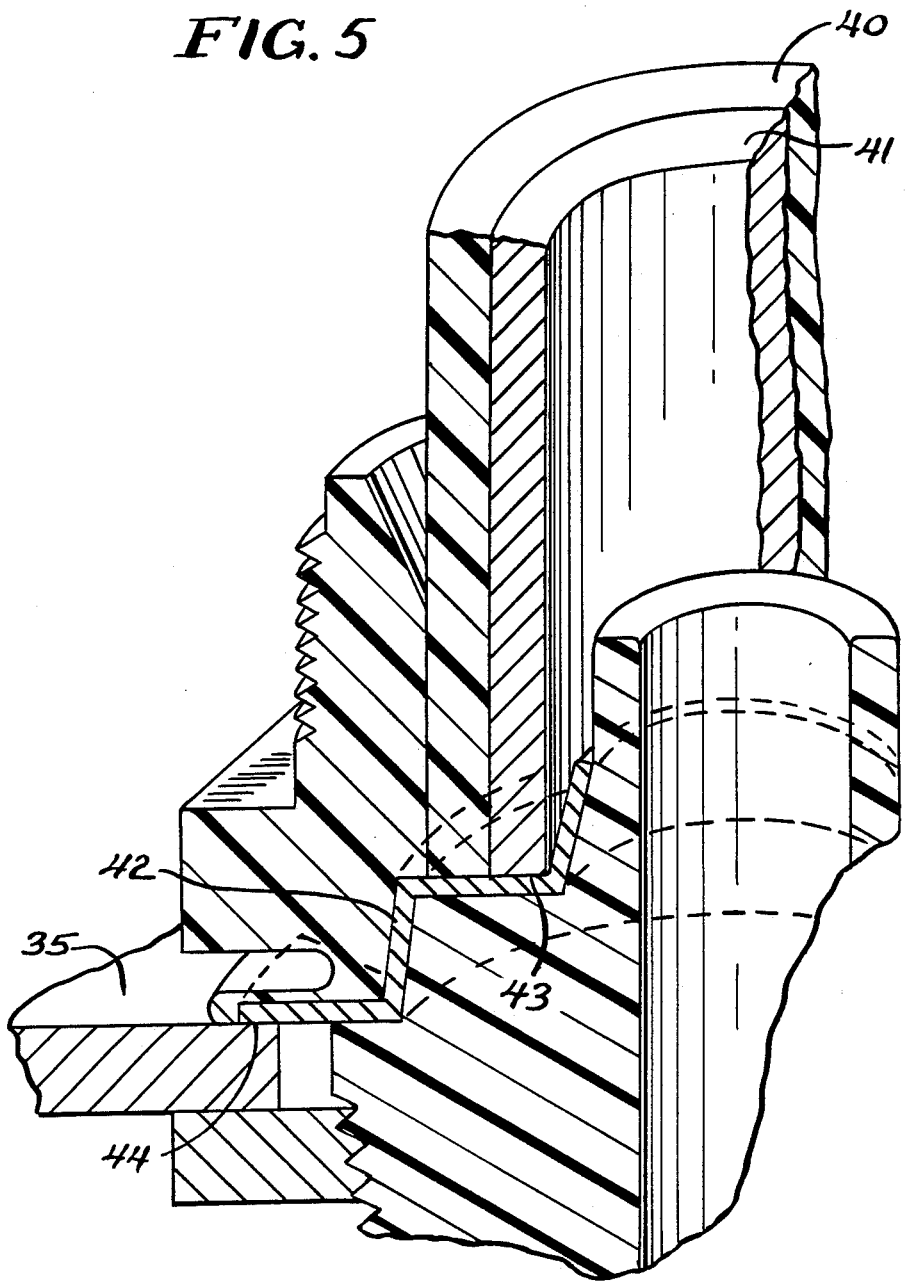
FIG. 5 is a section view of the connector body showing a modification of the preferred embodiment.

FIG. 5 shows a modification of the connector body used with a flexible conduit having a plastic jacket 40 and a metal core 41. It is necessary, when using this type of conduit, to ground the metal core 41. To provide the ground a piece of conductive material 42, such as copper, is molded into the plastic connector body 1. The conductive material 42 contacts the metal core 41 of the conduit at 43 and the fixture 35 at 44 and acts as a ground continuity path between the metal core and the metal of the electrical fixture.

Figure 6:
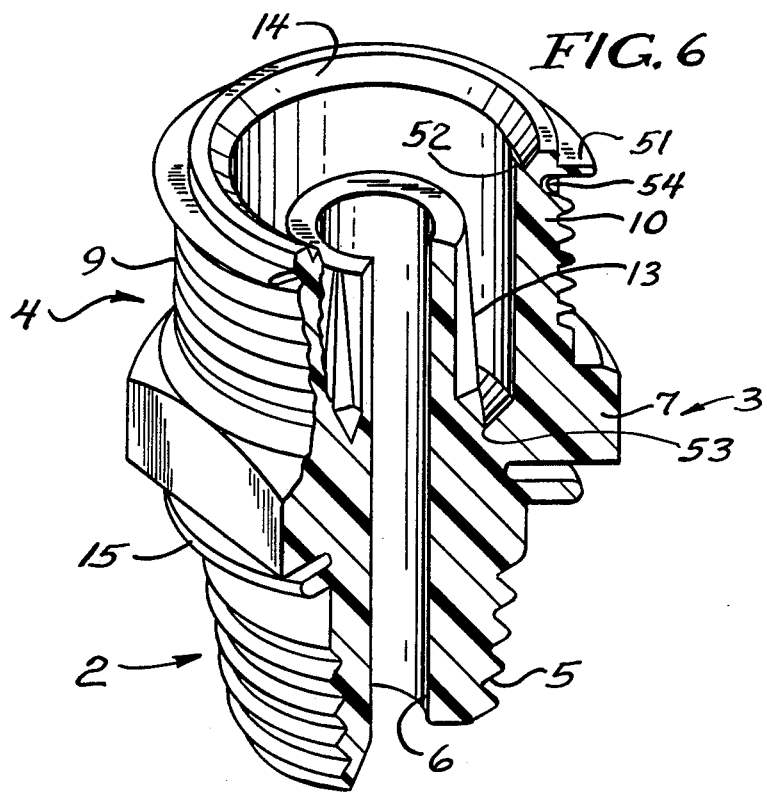
FIG. 6 is a partially cutaway isometric view of a second embodiment of the connector body.
Figure 7:
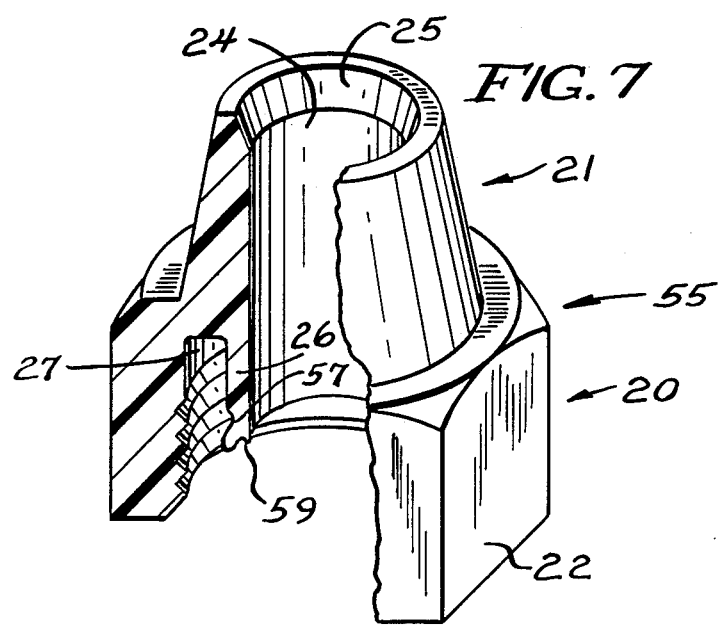
FIG. 7 is a partially cutaway isometric view of a second embodiment of the connector cap.
Figure 8:
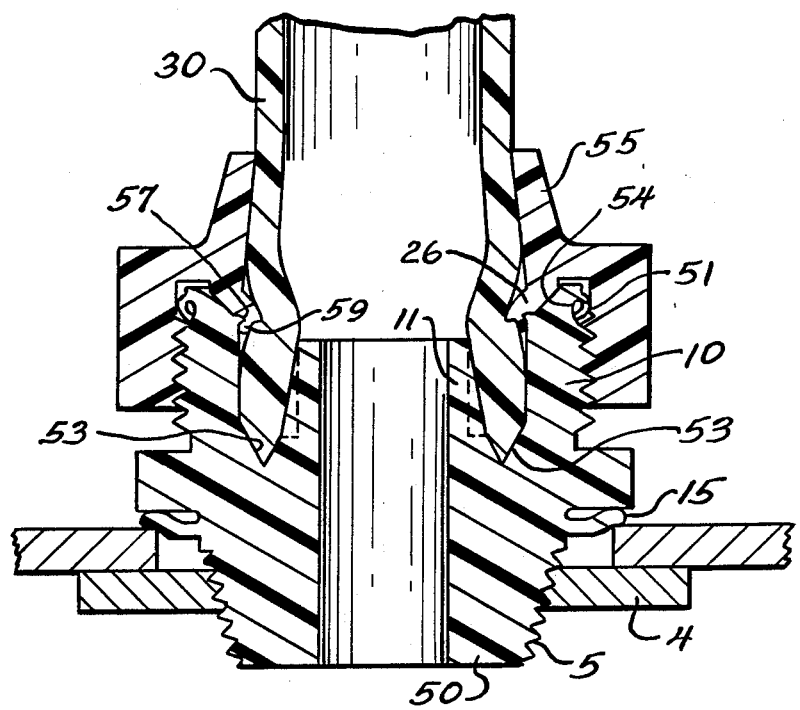
FIG. 8 is a section view of the second embodiment of the connector assembly in its connected condition.

FIGS. 6-8 show a second embodiment of the connector assembly in which like numerals are used to label like parts already described with respect to FIGS. 1-5. Referring more particularly to FIG. 6, the connector body 50 includes a sealing ring 51 formed integrally with the ring member 10. Disposed below the sealing ring 51 and coextensive therewith is annular cavity 54. The sealing ring 51 extends around the entire periphery of the ring member 10 and is deformed by engagement with the connector cap to form a liquid-tight seal as will hereinafter be described.

The connector body 50 also includes an upwardly extending rim 52 integrally formed about the periphery of the deflecting ramp 14. The rim 52 is deformed when the connector is assembled and engages a recess formed on the connector cap to lock the wedging ring 26 into engagement with the flexible conduit as will hereinafter be explained.

Finally, the bottom of the annular cavity 12 of the connector body 50 is formed as a V-shaped recess 53 for receiving the edge of the flexible conduit 30. The V-shaped recess 53 provides a greater sealing action as the conduit is wedged into the recess as will be shown and described with respect to FIG. 8.

The connector cap 55, shown in FIG. 7, is identical to the connector cap 18 of FIG. 2 except that an annular recess 57 is formed along the surface of the wedging ring 26 which faces cavity 27 and ridges 59 are formed in the distal end thereof. The recessed 57 is engaged by the rim 52 of the connector body 50 to lock the wedging ring 26 into position where the connector is assembled. Moreover, the ridges 59 'grip' the outer surface of conduit 30 and force the end thereof into V-shaped recess 53.

Referring more particularly to FIG. 8, when the connector is assembled the sealing ring 51 abuts, and is deformed by, the wall of the connector cap 55. Due to the natural resiliency of the plastic material of the sealing ring 51, it rolls into the annular cavity 54 and maintains sealing contact with the connector cap 55. Thus, an added protection against leadage of the connector is provided.

As explained with respect to FIG. 3 and 4, when the connector cap is tightened into engagement with the connector body the deflection ramp 14 forces the wedging ring 26 into engagement with the conduit 30. In the embodiment illustrated in FIGS. 6-8 the deflection ramp also locks the wedging ring into engagement with the conduit. As shown in FIG. 8, the rim 52 is folded towards annular cavity 12 by the wedging ring 26 as it slides over the deflection ramp 14. As the recess 57 of the connector cap 55 passes the rim 52, the rim 52 flexes toward its initial position due to the natural resiliency of the material and engages recess 57. Thus, the rim 52 is biased into engagement with the recess 57 due to the resiliency of the plastic material to lock the wedging ring 26 into position and create an additional liquid-tight seal.

As the wedging ring is locked into position by the engagement of rim 52 and recess 57, the ridges 59 formed at the end thereof "grips" the outer wall of conduit 30 and forces the end of conduit 30 into engagement with the V-shaped recess 53. As the conduit is pushed into the narrowing recess 53 a tighter seal is created between the conduit and the connector body.

Although the invention has been described with a certain degree of particularity, it is understood that the present disclosure has been made by way of example only. Numerous changes in the details and construction will be apparent without departing from the spirit and scope of the invention.

What is claimed is:

1. A connector assembly for connecting liquid-tight flexible electrical conduit to an electrical fixture, comprising:
    (a) a plastic connector body including: a first portion formed with a means for connecting said connector body to the electrical fixture; a central portion; said first portion and central portion having a centrally located axially extending bore; a second portion having a ring member formed with a first set of screwthreads, said ring member having a deflection ramp formed therein; an internal conduit support forming an extension of said axially extending bore such that an annular cavity is formed between said ring member and said internal conduit support; and a rim member formed along the periphery of said deflection ramp and extending outwardly therefrom;
    (b) a plastic connector cap comprising: a first portion having an axially extending centrally located bore; a second portion formed with a second set of screwthreads engageable with said first set of screwthreads on said connector body second portion; a wedging ring having a plurality of ridges formed at substantually the distal end thereof, said wedging ring being coextensive with said bore such that said bore is extended into the area defined by said second set of screwthreads forming a second annular cavity between said wedging ring and said second set of screwthreads; and a recess formed on the periphery of said wedging ring and being coextensive with said rim member, said recess being disposed within said second annular cavity;
    (c) said bore of said connector cap and said bore of said connector body being adapted to receive a conduit; said second set of screwthreads being engageable with first set of screwthreads to join said connector cap to said connector body; said wedging ring being deformed inwardly by said deflection ramp as said connector cap is screwed into engagement with connector body such that said rim member engages said recess to lock the wedging ring in its deformed position and said plurality of ridges of said wedging ring being able to grip the conduit and force the conduit into said annular cavity to form a liquid-tight seal as the wedging ring is deformed inwardly.

2. The connector assembly of claim 1, further including a deformable sealing ring formed on said ring member and extending radially therefrom.

3. The connector assembly of claim 1, further including a recess located adjacent said deformable sealing ring and coextensive therewith such that when said deformable sealing ring is deformed it rolls into said recess.

4. The connector assembly of claim 1, further including a V-shaped recess formed in the bottom of said annular cavity such that the end of the conduit is forced into said V-shaped recess.

5. The connector assembly of claim 1, wherein said central portion includes a wrenching shoulder comprising a plurality of flat faces arranged about the periphery of said connector body.

6. The connector assembly of claim 1, wherein said central portion includes an integrally formed sealing ring for creating a liquid-tight seal with the electrical fixture.

7. The connector assembly of claim 1, wherein a plurality of anti-rotation ribs are arranged on the outer surface of said internal conduit support to prevent twisting of the conduit as said connector cap is screwed into engagement with said connector body.

8. The connector assembly of claim 7, wherein said anti-rotation ribs are triangular in profile.

9. The connector assembly of claim 1, wherein said connector cap upper portion has a beveled edge at the mouth of said bore to facilitate the insertion of the conduit into the connector assembly.

10. The connector assembly of claim 1, wherein a piece of conductive material is molded into said connector body to provide a ground continuity path between the conduit and the electrical fixture.

11. The connector assembly of claim 1 wherein the connector body and cap are each of unitary construction.

* * * * *